US008736925B2

(12) United States Patent
Mayer et al.

(10) Patent No.: US 8,736,925 B2
(45) Date of Patent: May 27, 2014

(54) SWIPE LINEAR IMAGE SENSOR WITH ANALOG AND DIGITAL SUMMATION AND CORRESPONDING METHOD

(75) Inventors: Frederic Mayer, Voiron (FR); Vincent Hibon, Grenoble (FR); Henri Bugnet, Moirans (FR); Joel Vaillant, Voiron (FR)

(73) Assignee: E2V Semiconductors, Saint-Égrève (FR)

( * ) Notice: Subject to any disclaimer, the term of this patent is extended or adjusted under 35 U.S.C. 154(b) by 11 days.

(21) Appl. No.: 13/696,206

(22) PCT Filed: May 3, 2011

(86) PCT No.: PCT/EP2011/057055
§ 371 (c)(1),
(2), (4) Date: Nov. 5, 2012

(87) PCT Pub. No.: WO2011/138326
PCT Pub. Date: Nov. 10, 2011

(65) Prior Publication Data
US 2013/0057931 A1    Mar. 7, 2013

(30) Foreign Application Priority Data
May 4, 2010    (FR) ..................................... 10 01912

(51) Int. Cl.
*H04N 1/04*        (2006.01)
*H04N 1/387*       (2006.01)
*G01B 11/30*       (2006.01)
*G06K 9/40*        (2006.01)
*G06K 9/36*        (2006.01)
*G06K 7/10*        (2006.01)

(52) U.S. Cl.
USPC ........... 358/494; 358/450; 358/474; 356/607; 382/275; 382/284; 235/455

(58) Field of Classification Search
USPC ........... 358/494, 450, 474; 356/607; 382/275, 382/284; 235/455
See application file for complete search history.

(56) References Cited

U.S. PATENT DOCUMENTS

| 5,036,545 | A | * | 7/1991 | Iida et al. ...................... 382/284 |
| 5,430,282 | A | * | 7/1995 | Smith et al. .................... 235/455 |
| 5,469,274 | A | * | 11/1995 | Iwasaki et al. ................. 358/450 |
| 8,094,967 | B2 | * | 1/2012 | Diggins ......................... 382/275 |
| 2010/0046853 | A1 | | 2/2010 | Goodnough et al. |
| 2011/0292406 | A1 | * | 12/2011 | Hollenbeck et al. .......... 356/607 |

OTHER PUBLICATIONS

International Search Report dtd Jun. 9, 2011 (French Language).

* cited by examiner

*Primary Examiner* — Charlotte M Baker
*Assistant Examiner* — Rury Grisham
(74) *Attorney, Agent, or Firm* — Lowe Hauptman & Ham, LLP

(57) ABSTRACT

The invention relates to scanning linear image sensors with signal integration, in which an image of a line of points from an observed scene is reconstructed by the addition of successive images taken by a plurality of photosensitive lines which successively observe the same line of the scene as the scene moves across the sensor perpendicularly to the lines. The sensor according to the invention uses charge transfer pixels ($P_{m,i,j}$) grouped into M groups of N lines; an analog charge summation is carried out in each group; and the results of this summation are read by read circuits ($READ_m$) associated with each group, and then digitized and added to those of the other groups.

10 Claims, 3 Drawing Sheets

Figure 1:
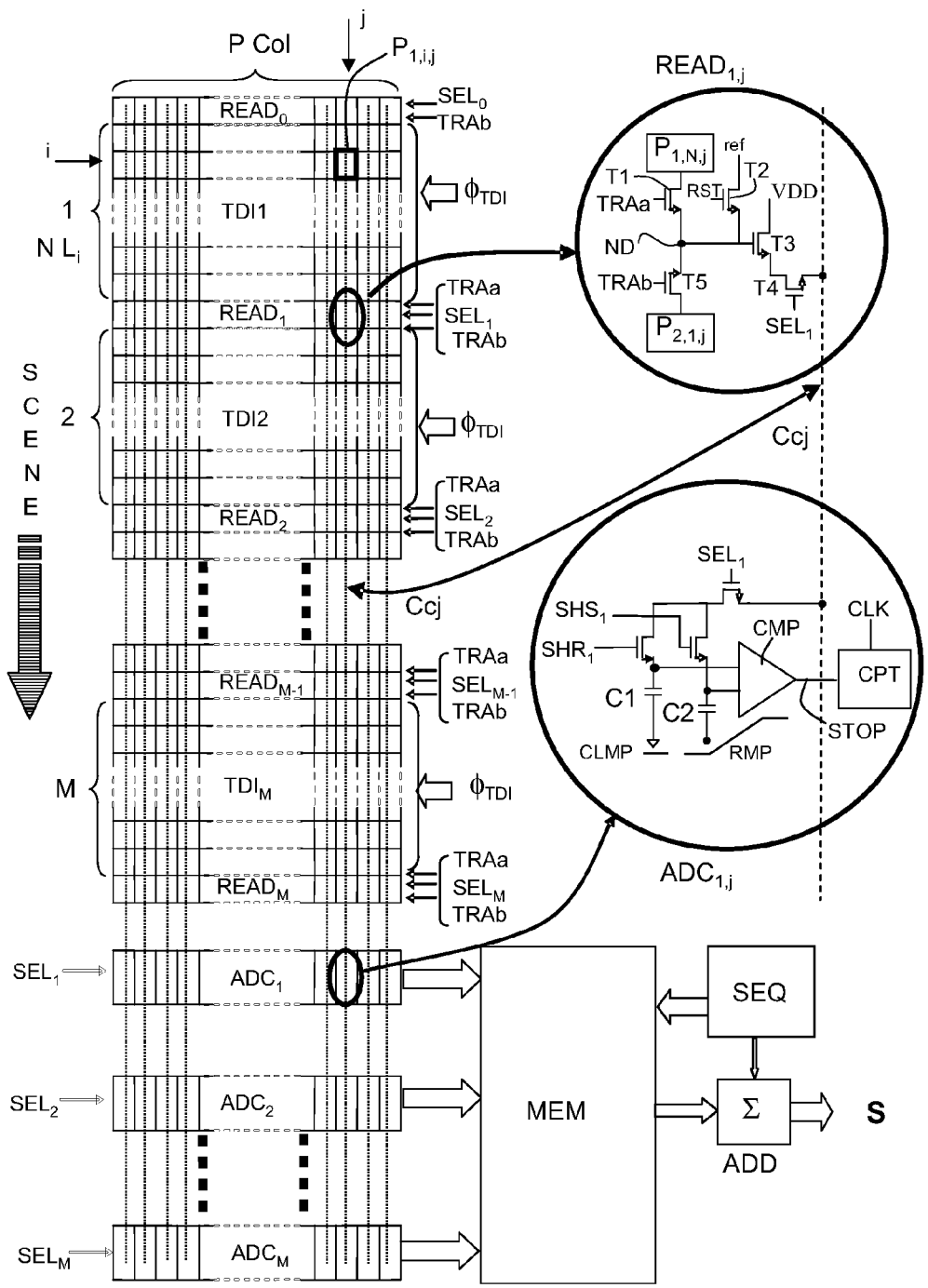

SWIPE LINEAR IMAGE SENSOR WITH ANALOG AND DIGITAL SUMMATION AND CORRESPONDING METHOD

The invention relates to scanning linear image sensors with signal integration (or TDI sensors, from the expression "Time Delay Integration Linear Sensors"), in which an image of a line of points from an observed scene is reconstructed by the addition of successive images taken by a plurality of photosensitive lines which successively observe the same line of the scene as the scene moves across the sensor perpendicularly to the lines.

These sensors are used, for example, in satellite-based earth observation systems. They comprise a plurality of parallel lines of photosensitive pixels; the sequencing of the control circuits of the different lines (for controlling the exposure time and the time for reading the photogenerated charges) is synchronized with respect to the relative movement of the scene and the sensor, in such a way that all the lines of the sensor see a single line of the observed scene. The generated signals are then added in a point to point manner for each point of the observed line.

The theoretical signal/noise ratio is improved in the ratio of the square root of the number N of lines of the sensor. This number can vary from a few lines to about a hundred, depending on the application (industrial control, terrestrial observation, panoramic dental radiography or mammography).

In charge transfer sensors (CCD sensors), the signals are added point by point in a natural way without reading noise, by dumping into a line of pixels the charges generated and accumulated in the preceding line of pixels, in synchronization with the relative movement of the scene and the sensor. The last line of pixels, having accumulated N times the charges generated by the observed scene line, can then be transferred toward an output register and converted, during a read step, into electric current or voltage.

Charge transfer sensors of this type are already in use in conventional technologies with adjacent transfer gates made from at least two levels of polycrystalline silicon, the second level partially covering the first, and also in technologies with a single polycrystalline silicon gate level, which are more compatible with present-day methods of fabricating CMOS logic integrated circuits.

Clearly, if each pixel has to be capable of storing the charges resulting from the addition of charges received from N pixels, it must have a much higher storage capacity than if it only had to store its own charges. Otherwise there would be a risk of saturation of the pixel. To avoid this, the size of the pixel would have to be increased, thereby adversely affecting the resolution of the sensor.

In order to carry out charge integration without excessive noise while allowing the addition of charges without excessive risk of saturation of the pixels receiving the accumulated charges from the other pixels, the invention proposes a method for the operation of a scanning image sensor with summation, allowing the synchronized reading of the same image line successively by a plurality of lines of P photosensitive pixels and the pixel to pixel summation of the signals read by the different lines and corresponding to the same image line. In this method, it is proposed that the lines of pixels be divided into a plurality of groups; within each group of lines, the summation is performed in an analog manner by charge transfer from pixel to pixel (in columns) with progressive accumulation of the charges corresponding to the same image point; the charges of the pixels of the last line of each group are read by a read circuit which is associated with this last line; the read circuit performs a charge-to-voltage conversion for each pixel; the analog signal resulting from this conversion is sent by a column conductor (the number of column conductors being equal to the number of pixels per line) toward a corresponding digitization circuit which establishes for each column a digital value corresponding to each analog signal, in other words to each group of lines, and a plurality of digital values, corresponding to respective groups of lines which have seen the same image line during the scan, are added together in each column.

Thus a low-noise analog summation by charge transfer and accumulation in a group of pixels is combined with a digital summation of the results of the analog summations, all these summations relating to the same image line observed during the scan.

More precisely, the invention proposes a scanning image sensor with summation, allowing the synchronized reading of the same image line by a plurality of lines of P photosensitive pixels successively and the pixel to pixel summation of the signals read by the different lines, characterized in that the sensor comprises:

an array of M groups of N lines of P pixels producing charges proportional to the illumination, these pixels being arranged in P charge transfer registers in a column of rank j, where j varies from 1 to P, allowing the progressive accumulation, in a pixel of rank j of the N-th line of pixels of a group of rank m (m=1 to M), of the charges collected in the N pixels of rank j of this group, within the array of pixels, M lines of P read circuits for reading the charges collected in the P pixels of the N-th line of a group of pixels, the read circuits of a line of rank m being positioned in line and each read circuit of rank j (j=1 to P) of this line being connected to a respective column conductor of rank j common to all the read circuits of rank j of the different lines, in order to provide on this conductor an analog electrical signal based on the charges accumulated in the pixels of rank j of the N-th line of any group of lines of pixels, outside the array of pixels, M lines of P digitization circuits, the digitization circuit of rank j of this line comprising a sampler for sampling an analog signal present on the column conductor of rank j, and an analog-digital converter for supplying a digital value of the analog signal, and a means of summation of digital values capable of adding together digital values obtained from the converters and corresponding to the sampling of a plurality of analog signals all corresponding to the observation of the same image point of rank j in an observed image line.

This structure combines the summation of analog charges, with low noise, on N successive lines, with the digital summation of the results of the analog summations, this digital summation allowing a high speed to be achieved.

The read circuits placed after each group of N lines of pixels are charge-to-voltage conversion circuits by means of which a potential representing the charges accumulated by N pixels in a column can be transferred to a column conductor. These read circuits include, in principle, a charge storage node, a transfer transistor for dumping the charges of a pixel of an N-th line toward the storage node, a transistor for reinitializing the potential of the storage node, a follower transistor for generating a potential representing the quantity of charges in the storage node, and a line selection transistor for selecting a line of read circuits among M and connecting the follower transistor of the read circuits of this line to a respective column conductor at the moment when the potentials are to be sampled in a digitization circuit.

The sampler forming part of an elementary digitization circuit preferably comprises means for initially storing a voltage reference level following a reinitialization pulse applied to the reinitialization transistor of a read circuit, and then storing a signal level following a transfer pulse applied to the transfer transistor; the analog-digital converter then converts the difference between these two levels. The reinitialization pulse and the transfer pulse are preferably common to all the read circuits of the M lines and the periodicity of these pulses corresponds to the time taken for the integration of charges in a line of pixels.

The summation means is preferably distributed in the digitization circuits. Thus there is an elementary summation means in the elementary digitization circuit of rank j of the line of rank m; this adds a current digital value, obtained from the conversion of an analog summation of charges of the group of lines of rank m, to a digital value previously obtained from the group of digitization circuits of rank m−1.

The analog-digital converter present in each digitization circuit is preferably a ramp converter comprising a comparator and a counter, with the counter counting at a fixed rate until the comparator is tripped when a voltage ramp is applied to an input of the comparator. The output of the counter of a digitization circuit of rank m in line and of rank j in column is preferably connected to an input of the counter of a digitization circuit of the same rank j in column and of rank m+1 in line so that the content of said counter of the circuit of rank m+1 at the end of the ramp corresponds to the addition of the quantity of light received by a group of N pixels and to the preceding content of the counter of rank m (corresponding to another group of N pixels which have seen the same image point).

It is possible to arrange for the line of read circuits to be incorporated in a line of pixels which may or may not be photosensitive, constructed so as to allow, in a selective way, either the transfer of charges between a last line of pixels of a group of N lines and a first line of pixels of the following group, or the dumping of charges from the last line of pixels of one group toward a storage node for the reading and digitization of the dumped charges.

In a specific embodiment, a means is provided for detecting the quantity of charges present in the pixel of rank j of the N-th line of pixels of a group of pixels of rank m, together with a means for reading these charges in the read circuit of rank m in line and of rank j in column if the quantity of charges exceeds a threshold, or for transferring these charges, without reading them, toward the first line of pixels of the group of pixels of rank m+1 if the quantity of charges is below this threshold.

The line of read circuits can be integrated in the N-th line of photosensitive pixels.

It should be noted that the summation of the digital value corresponding to the pixel of rank j of the line in an accumulator register of rank j which accumulates the digital values corresponding to the pixels of the same rank j of N successive lines has already been proposed (in patent FR 2 906 080). In this method, the pixels are active CMOS pixels (instead of charge transfer pixels) in which a charge-to-voltage conversion is performed within the pixel. The resulting analog voltage is converted to digital form and the additions of signals for signal integration synchronized with the scanning are digital additions of the signals obtained from the pixel. These conversions and digital additions give rise to a very high level of noise which the present invention reduces considerably by reducing the number of digital additions, while keeping a larger total number of summations.

Figure 2:
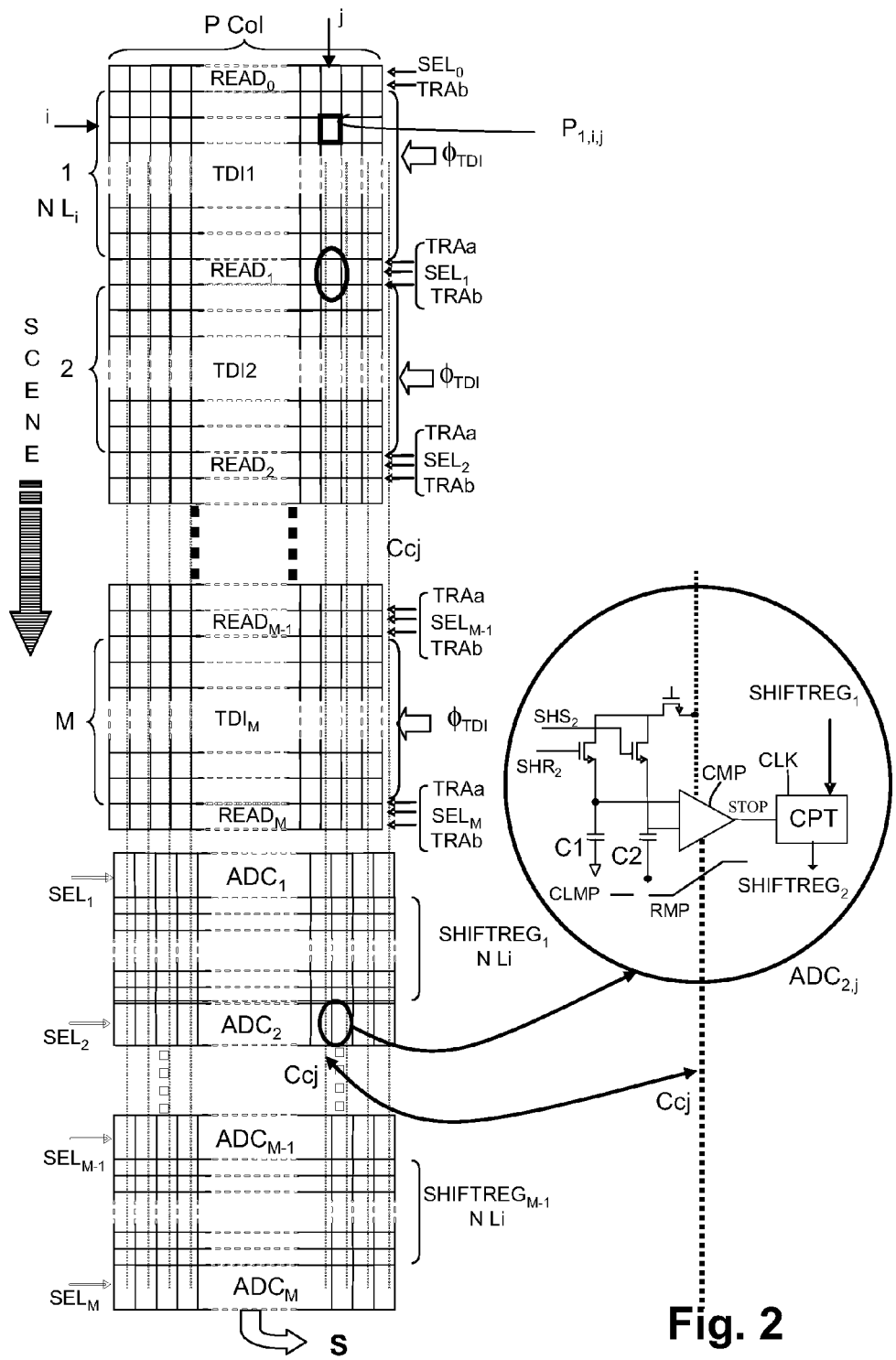
Figure 3:
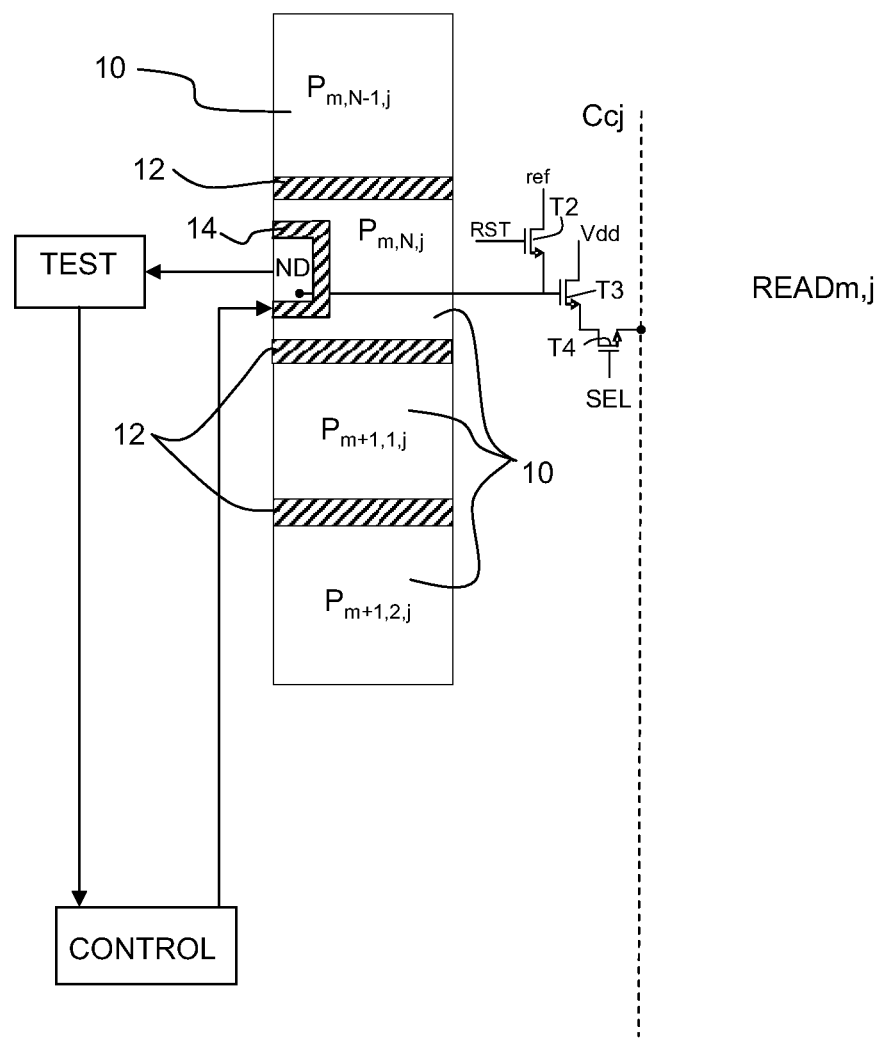

Other characteristics and advantages of the invention will be revealed by the following detailed description which refers to the attached drawings, in which:

FIG. 1 shows the general architecture of the image sensor according to the invention, FIG. 2 shows a variant of the architecture, and FIG. 3 shows a detail of a variant in which the read circuits are integrated with a line of photosensitive pixels.

FIG. 1 shows the general architecture of the sensor. The upper part of the diagram is the photosensitive part. It comprises M groups of N lines of P photosensitive pixels. The groups are numbered from 1 to M. A group of lines of pixels is denoted by TDI with a subscript from 1 to M: $TDI_1$ to $TDI_M$. A respective read circuit is placed between each two consecutive groups, as follows: $READ_1$ is associated with the group $TDI_1$ and located between the latter and the group $TDI_2$; similarly, $READ_2$ is associated with the group $TDI_2$, and so on until $READ_M$ located after the group $TDI_M$ and associated with the latter. A circuit $READ_o$ may optionally be provided before the group $TDI_1$ if it is desirable for the sensor to operate equally well in either direction of scanning.

Each group $TDI_m$, where m is the subscript denoting a group among M, is composed of an array of N lines and P columns; by convention, the pixel $P_{m,i,j}$ is located in the group of rank m (where m varies from 1 to M) at the intersection of the line of rank i, where i varies from 1 to N, with the column of rank j (where j varies from 1 to P). The grid of pixels is a grid operating in column charge transfer mode; in other words, after each unit integration time with a duration of T, the charges present in a line of pixels of rank i, including the charges generated by the illumination of this line during the time T, are dumped into the line of immediately higher rank, i+1; this is done simultaneously for all the lines, in such a way that the charges of the immediately preceding line of rank i−1 are dumped into the line of rank i and replace those which were dumped into the line of rank i+1. For the first line, the charges that have been discharged are not replaced, and therefore at the end of an integration time there are only the charges resulting from the integration of the light in the pixels during the time T; for a line of rank i, the charges present in the line at the end of an integration time with a duration of T are the sum of the charges integrated in the lines of ranks 1 to i during the i integration times which have just elapsed. The image is moved relative to the sensor in synchronization with the time T, in such a way that the i lines of pixels have seen the same image line during the i periods T.

The charges of the last line, corresponding to the accumulation of N observations of the same image line, are dumped after each integration time in the read circuit $READ_M$ so that they can be read there; it will be seen that, in a preferred embodiment, it is possible to choose whether to read the charges (and then destroy them) or, conversely, to transfer them toward the group of lines of the next rank m+1 in order to continue the integration, the latter transfer being useful where the illumination is weak.

The arrangements of photosensitive pixels which allow charge transfer in this way are well known; they use a plurality of electrodes for each line of pixels, these electrodes extending along the lines of pixels and being supplied with potentials which alternate between two values which are the same for each line of pixels, in such a way that the movements of charges from one line to another are simultaneous for all the lines of a group, and even for all the lines of the different groups. The electrodes control the formation of potential wells and potential barriers, and also the movement of charges from one well to another. These electrodes are not shown, and all the control signals or "control phases" of the electrodes which provide the charge transfers synchronized with the scanning of the image are simply denoted by the term $\Phi_{TDI}$. The $\Phi_{TDI}$ phases are identical for all the lines of pixels of all the groups of lines.

Some conventional charge transfer pixel technologies use two levels of polycrystalline silicon gates with the first level partially covered by the second level (in order to provide more efficient charge transfer). Other, more recent, technologies use only one level of polycrystalline silicon; these have the advantage of being more compatible with the MOS or CMOS transistor integrated circuit technologies, and these technologies are preferred because the architecture of the sensor according to the invention requires the use of MOS transistor read circuits.

The read circuit $READ_m$ associated with the group $TDI_m$ comprises P elementary read circuits $READ_{m,j}$, one for each column of pixels in the array $TDI_m$.

Each elementary read circuit of rank j (j=1 to j=P) is a transistor circuit which performs a charge-to-voltage conversion so as to transfer to a column conductor Ccj of rank j a potential representing the quantity of charges present in the pixel of rank j of the last line of the group $TDI_m$. By contrast with the read circuits used in conventional charge transfer arrays, therefore, the read circuit is not a "horizontal" charge transfer shift register which collects the charges from the last line of the array and sends them toward a single conversion circuit.

The detail of an elementary read circuit $READ_{1,j}$ (associated with the first group $TDI_1$) of column rank j is shown in FIG. 1. It comprises an intermediate storage node ND where the charges from pixel $P_{1,N,j}$ of rank N of the group $TDI_1$ will be dumped, a transfer transistor T1 for performing this dump, a reinitialization transistor T2 for discharging the charges from the storage node after a dump, a follower transistor T3 for converting the charges to voltage, and a group selection transistor T4 for connecting the follower transistor to the column conductor Ccj when a potential representing the charges accumulated in the storage node is to be transferred to this conductor.

A second transfer transistor T5 is provided if necessary for transferring the charges from the storage node in the reverse direction (from the group $TDI_2$ toward the read circuit $READ_1$).

The transfer transistor T1, controlled by a signal TRAa, connects a charge storage area of the pixel of the last line to the storage node ND (a floating diffusion). The reinitialization transistor, controlled by a signal RST, connects the storage node to a discharge drain at a reference potential. The gate of the follower transistor T3 is connected to the storage node, its drain is connected to a power supply potential, and its source is connected to the drain of the selection transistor T4. The selection transistor, controlled by a selection signal $SEL_1$ (for the read circuit $READ_{1,j}$), connects the source of the follower transistor T3 to the column conductor Ccj. The selection signal $SEL_1$ is common to the whole line of read circuits $READ_{1,j}$.

The second transfer transistor T5, if present, can be made conducting by a signal TRAb.

The read circuit $READ_m$ occupies a height, in the direction of the columns of pixels, equal to the height of a line of pixels or a multiple of this height, thus making it possible to maintain synchronization between the scanning of an image line and the integration times T when an image line passes successively across the different groups of lines.

This completes the description of the photosensitive part of the sensor.

The lower part of the diagram in FIG. 1 shows the digitization and digital summation part of the sensor. This part comprises a number of lines of digitization circuits equal to the number of groups of lines of pixels, in other words equal to M. The lines of the digitization circuits are denoted $ADC_1$ to $ADC_M$. Each line comprises P elementary digitization circuits $ADC_{m,j}$. Digital summation circuits are also provided for performing additions based on the outputs of the digitization circuits.

The inputs of the elementary digitization circuits of ranks j=1 to j=P are the column conductors Ccj.

The potentials resulting from the addition of N quantities of charges corresponding to the same image point are applied to a column conductor of rank j by means of the elementary read circuits. A potential is applied to the column conductor successively for the different groups of lines of pixels and this is done on each occasion for all the columns of pixels simultaneously, because there are P elementary read circuits operating in parallel, each associated with a respective column conductor. The repetition interval of the potential transfers to the column conductor for each group of N lines is the integration time T, and all the groups must be read successively during this time T.

At each time T, therefore, the read sequence comprises the successive addressing of the read circuits $READ_1$ to $READ_M$ for the successive transfer to the column conductor of the data obtained from the last line of rank N of each of the M groups of lines of pixels.

The read circuit selection signals, $SEL_1$ to $SEL_M$, therefore follow in sequence. The reinitialization signals RST can be common to the whole sensor; alternatively, they can be separate. The transfer signals TRAa or TRAb are common to the whole sensor.

Each line of digitization circuits $ADC_1$ to $ADC_M$ is associated with a respective line of read circuits $READ_1$ to $READ_M$. The line of digitization circuits of rank m is put into operation for the purpose of digitization when the column conductor receives the potential to be digitized from the read circuit of rank m. For this purpose, the digitization circuits $ADC_m$ are controlled by the same selection signal $SEL_m$ as that used to select the read circuits of rank m.

FIG. 1 shows the detail of a possible example of an elementary digitization circuit $ADC_{1,j}$ of column rank j and line rank 1, associated with the elementary read circuit $READ_{1,j}$ of the same rank. It comprises a sample and hold circuit designed to perform a double sampling, and a ramp-type analog-digital converter. The sampler comprises two capacitors, C1 and C2, and transistor switches; the ramp converter comprises a counter CPT which counts at a constant rate set by a clock CLK and a comparator CMP which controls the stopping of the counter.

The capacitor C1 of the sampler is connected at one end to a reference potential and at the other end to a switch which can connect it to the column conductor Ccj. This switch is controlled by a first signal $SHR_1$ common to the P samplers of the line of rank 1.

The capacitor C2 receives at one end a linear ramp voltage starting from the same reference potential as that used for the capacitor C1. At its other end it is connected by a switch to the column conductor Ccj. This switch is controlled by a signal $SHR_1$ common to the whole line of rank 1.

However, the capacitors are not directly connected to the column conductor by the two aforementioned switches. A selection switch controlled by the signal $SEL_1$ makes it possible to connect the capacitors only during the selection of the line concerned, in this case the line of rank 1.

The sampling for a given line $ADC_m$ of digitization circuits takes place in two steps, as follows:

a) after the reinitialization of the storage nodes ND of the read circuits, the line is selected, the signal SHR for the line is established and the reinitialization level corresponding to this line is therefore stored in the capacitor C1, this level being present at this moment on the column conductor because of the read circuit of the same rank $READ_m$, and these operations are repeated for all the lines of ranks 1 to m;

b) there is a global charge transfer for the whole array (TRAa) toward the storage nodes, and the line is again selected ($SEL_m$ active), the signal $SHS_m$ for the line is established and the useful signal level corresponding to this line is therefore stored in the capacitor C2, this level being present on the column conductor because of the read circuit $READ_m$ which is again selected, and these operations are then repeated for all the lines.

At this stage, the capacitors contain, for each elementary circuit of each line 1 to m, a reinitialization potential level and a useful signal potential level. The terminals of the capacitors charged by these levels are connected to the inputs of the comparator CMP.

A conversion ramp RMP applied to the capacitor C2 is then triggered for the whole array. It is assumed at this point that the useful signal potential is more negative than the reference potential and a voltage ramp rising from the reference potential is used; the reference potential represents a maximum possible level for the useful signal.

The counting by the counter CPT is triggered at the same time as the start of the ramp is triggered. The ramp causes the potential to rise at one input of the comparator. When the potential at this input reaches the potential at the other input, the comparator switches and interrupts the counting. The final content of the counter is a digital value proportional to the difference between the useful potential level and the reinitialization level. It therefore represents the result of digitization with correlated double sampling.

The conversion is performed simultaneously for all the digitization circuits of the sensor. The clock CLK is common to all of them. The ramp RMP can also be common to all the circuits. The conversion is performed periodically with the period T between the moment when all the capacitors C2 have been charged to a useful value and the moment when new reinitialization values start to be read in the read circuits.

At this moment, all the counters of the digitization circuits contain a digital value. The charge shift and integration operation requires the addition of all the digital values corresponding to the observation of the same image point by the different pixels of the same column of pixels of the sensor.

The digital values are therefore extracted from the counters for the purpose of this summation.

In the general case, the digital values stored in the various counters of the same column do not correspond to the same image point, because there is a time shift of N periods between the observation of an image point by the read circuit of rank m and the read circuit of rank m+1.

The contents of the individual counters must therefore be stored and then added to contents which correspond to the same image point. This storage is carried out in a memory MEM for each line. The contents of the counters are reset to zero after they have been read, because they have to receive a new data element at each period T.

The digital addition is performed by an adder ADD under the control of a sequencer SEQ which determines which additions are to be performed in order to add up the digital data corresponding to the same image point. The output S of the adder represents the desired image.

Since the sequencing of the additions is relatively complicated and requires a large memory capacity, it may be preferable, in a different embodiment, not to reset the contents of the counter to zero after a read, but to load into the counter, before each conversion, an initial value which already represents an accumulation of the digital values obtained for the same image point by the preceding groups of N lines. The counter then counts from this initial value, and its final content represents a supplementary accumulation for this image point. This content is transmitted to the next line of digitization circuits, but with a delay of N×T corresponding to the shift of N lines of pixels, for the purpose of loading an initial value into the next counter at the moment when the latter is required to convert a value still corresponding to the same image point. This process continues in the same way with the counters of the last line of digitization circuit, all containing an accumulation of M digital values all corresponding to the same image point, these M digital values being themselves conversions of charges which are the accumulation of charges supplied by N pixels which have seen the same image point.

FIG. 2 shows an embodiment of this solution: a line of rank m of digitization circuits is separated from the next line of rank m+1 by N lines of digital registers operating as shift registers in the vertical direction with a shift period T: the content of the line counters of rank m is transferred into the first line of registers, and then at each period the contents of the registers of one line advance into the next line. At the end of N periods, the content of the last line of registers is applied as the digital initialization value to the counters of the line of digitization circuits of rank m+1. During the conversion, the counters count from this value.

The group of N lines of digital registers following the line of digitization circuits $ADC_m$ is denoted $SHIFTREG_m$. There are no shift registers after the line $ADC_M$ because the counters of this line contain the accumulation of digital values which is required.

The detail of an elementary digitization circuit $ADC_{2,j}$ of line rank 2 and column rank j is shown; it is similar to that of FIG. 1 and operates in the same way, but there is an initialization input for the counter, this input receiving the output of the N-th line of the shift register of the preceding rank $SHIFTREG_1$; the output of the counter is connected to the first line of registers of the shift register of the following rank $SHIFTREG_2$.

For the circuit of FIG. 1, as for that of FIG. 2, it will be evident that, if a bidirectional scanning sensor is required, the additional read circuit $READ_0$ is necessary, and the synchronization of the selection of the read circuit and of the corresponding digitization circuit will clearly have to be reconfigured: for scanning in the opposite direction to that which has been described, the first line, of rank 1, of the group of rank m contains the accumulation of N acquisitions of the same line and it is the read circuit of rank m−1 that will read this accumulation, but it is the line of digitization circuits of rank m that will digitize this accumulation. Consequently, unless a supplementary line of rank 0 is provided for the digitization, the selection signal SEL of the read circuits of rank m−1 must be synchronized with the selection signal of the digitization circuits of rank m. In the other direction, the selection of the read circuits of rank m was synchronized with the selection of the digitization circuits of rank m.

In the preceding text it was assumed that the line of read circuits $READ_m$ was a line of electrical circuitry containing only the storage node and the five transistors mentioned. The line of read circuits could equally well be arranged as a line in the form of a charge transfer area allowing direct transfer between two groups of N lines. In this case, it is unnecessary to provide the transfer transistors TRAa and TRAb; these are replaced by normal transfer gates between pixels. It is also possible to arrange the line of read circuits as a line of photosensitive pixels in which part of the surface which would normally be reserved for the generation of photosensitive charges is used to house a storage node electrically isolated from the rest of the photosensitive surface.

FIG. 3 shows this solution. The area of passage between two successive groups of N lines, of rank m and m+1 for example, can be seen here. A single column of pixels of rank j is shown, with pixels $P_{m,N-1,j}$ (the penultimate line of group m), $P_{m,N,j}$ (the last line), $P_{m+1,1,j}$ et $P_{m+1,2,j}$ (the first and second lines of the next group m+1). The reinitialization transistor T2, the follower transistor T3, and the selection transistor T4, which form part of the read circuit of rank m, are shown next to the N-th pixel $P_{m,N,j}$.

The pixels are shown symbolically as photon capture areas 10 separated by transfer gates 12, but in reality the pixels may be more complex.

The surface of the N-th pixel is partially used to create a charge storage node ND (which may be an N+ type diffusion in a substrate P). This node ND is isolated by a gate 14 which acts as the transfer gate TRAa mentioned with reference to FIG. 1, in other words a gate for transferring the charges from the N-th pixel toward the storage node. The node is connected to the gate of the follower transistor T3 and to the source of the reinitialization transistor as explained with reference to FIG. 1.

It can be seen that, with this arrangement, the charges stored in the N-th pixel naturally travel toward the first pixel of the next group of lines, unless they are deflected toward the storage node. The gate 14 can be controlled selectively to allow the charges to pass through, to continue an accumulation of analog charges, or to deflect them toward the storage node for the purpose of digitizing them. In particular, it is possible to arrange for the charges to be allowed to pass if the quantity of charges is small, and to be deflected toward the storage node if the quantity is large. In the first case, the charges proceed along their path and accumulate with the charges from the pixels of the lines of the next group; they do not undergo analog-digital conversion and are not added digitally; they continue to be accumulated in an analog manner with low noise. In the second case, the charges are digitized and a digital summation is performed.

It is also possible to use an appropriate polarization of the gate 14 to test the quantity of charges present in the pixel: constant polarization of the gate 14 is chosen to make some of the charges in the N-th pixel, above a quantity threshold, overflow naturally into the storage node; the potential of the storage node is then detected in order to test the presence of a charge dump; if there has been a natural dump it is considered that there are too many charges, and therefore the charges must be read, digitized and added digitally to the charges digitized for other groups of lines of pixels; in this case, a signal for the complete opening of the barrier between the N-th pixel and the storage node is applied to the gate, and the collected charges are read. On the other hand, if no charge dump is detected, it is considered that analog integration into the next group of lines can be continued, and the charges contained in the N-th pixel are not read; the charges move from the N-th pixel of the group m toward the first pixel of the next group.

The solution in which the N-th photosensitive line is used as the read line is only possible if the pixels are large enough to contain both a charge storage surface and the transistors of the read circuit, without perturbing the transfer of charges from the (N−1)-th pixel toward the N-th pixel and from the latter toward the next group of lines. It should be noted that the storage surface 10 of the N-th pixel is not necessarily photosensitive; it may be masked by an opaque layer, and in this case the integration of charges only takes place on N−1 pixels, but the storage surface is formed as if it were a photosensitive pixel of the charge transfer type, in other words one allowing the transfer of the charges from the group of lines of rank m to the next group.

In these various embodiments, it is possible to arrange for the number of lines N to vary from one group to another in certain cases. Clearly, the number of lines of digital registers in the embodiment of FIG. 2 will still match the number of lines in the associated group of lines of pixels.

The samplers have been described as if each had two capacitors, storing the reinitialization level and the useful signal level respectively, but samplers with a single capacitor storing the two levels successively may be used.

It should be noted that the same image line has been converted successively by all the M digitization circuits, which averages out the conversion errors for all the pixels.

In the embodiment of FIG. 2, the read circuits can be tested independently of the pixel array by sending a test sequence to the first line of counters to check its propagation to the last line.

The sensor can be adapted to the average light level by the modification of the gradient of the converter ramp.

Another way of adapting to the average light level is to reduce the number of digital conversion stages used, where the light level is high, and simply use the data added up in M' stages (M'<M).

The sensor according to the invention can be constructed on a substrate of reduced thickness illuminated on the rear face (opposite the front face on which the transistors of the sensor circuits are fabricated).

The invention claimed is:

1. A scanning image sensor with summation, allowing a synchronized reading of a same image line by a plurality of lines of P photosensitive pixels successively and allowing a pixel to pixel summation of signals read by the different lines, wherein the sensor comprises:

an array of M groups of N lines of P pixels producing charges proportional to illumination, these pixels being arranged in P columns, each column of rank j, where j varies from 1 to P, comprising M respective charge transfer register, allowing progressive accumulation, in a pixel of rank j of a N-th line of P pixels of a group of rank m, where m varies from 1 to M, of charges collected in the N pixels of rank j of this group, within the array, M lines of P read circuits for reading charges collected in the P pixels of the N-th line of a group of pixels, each read circuit of rank j of a line of rank m being connected to a respective column conductor of rank j common to all the read circuits of rank j of the different lines, in order to provide on this column conductor an analog electrical signal based on the charges accumulated in the pixel of rank j of the N-th line of any group of lines of pixels, outside the array of pixels, M lines of P digitization circuits, the digitization circuit of rank j of a respective line of P digitization circuits comprising a sampler for sampling an analog signal present on said column conductor of rank j, and an analog-digital converter for supplying a digital value of said analog signal, and a summation means for summing digital values, capable of adding together digital values obtained from the converters and corresponding to a sampling of a plurality of analog signals all corresponding to an observation of a same image point of rank j in an observed image line.

2. The image sensor as claimed in claim 1, wherein each read circuit comprises a charge-to-voltage conversion circuit by means of which a potential representing charges accumulated by N pixels in a same column can be transferred to said column conductor.

3. The image sensor as claimed in claim 2, wherein each read circuit includes a charge storage node, a transfer transistor for dumping the charges of a pixel of an N-th line toward the storage node, a reinitialization transistor for reinitializing the potential of the storage node, a follower transistor for generating a potential representing a quantity of charges in the storage node, and a line selection transistor for selecting a line of read circuits among M and connecting the follower transistor of the read circuits of the selected line to a respective column conductor.

4. The image sensor as claimed in claim 3, wherein the sampler forming part of a digitization circuit comprises means for initially storing a voltage reference level following a reinitialization pulse applied to the reinitialization transistor of a read circuit, and then storing a signal level following a transfer pulse applied to the transfer transistor.

5. The image sensor as claimed in claim 1, wherein the summation means is distributed in the digitization circuits.

6. The image sensor as claimed in claim 1, wherein the analog-digital converter present in each digitization circuit is a ramp converter comprising a comparator and a counter, with the counter counting at a fixed rate until the comparator is tripped when a voltage ramp is applied to an input of the comparator.

7. The image sensor as claimed in claim 6, wherein the counter of a digitization circuit of rank m in line and of rank j in column has an output connected to an initialization input of the counter of a digitization circuit of the same rank j in column and of rank m+1 in line so that said counter of the circuit of rank m+1 at the end of the ramp has a content corresponding to the addition of a quantity of light received by a group of N pixels and to a preceding content of the counter of rank m, corresponding to another group of N pixels which have seen the same image point.

8. The image sensor as claimed in claim 1, wherein the line of read circuits is incorporated in a line of pixels which may or may not be photosensitive, constructed so as to allow, in a selective way, either a transfer of charges between a last line of pixels of a group of N lines and a first line of pixels of a following group, or a dumping of charges from the last line of pixels of one group toward a storage node for the reading and digitization of the dumped charges.

9. The image sensor as claimed in claim 8, comprising in each line of read circuits a means for detecting a quantity of charges present in the pixel of rank j of the N-th line of pixels of a group of pixels of rank m, together with a means for reading these charges in the read circuit of rank m in line and of rank j in column if said quantity of charges exceeds a threshold, or for transferring said quantity of charges, without reading them, toward the first line of pixels of the group of pixels of rank m+1 if said quantity of charges is below said threshold.

10. A method for operating a scanning image sensor with summation, allowing a synchronized reading of a same image line successively by a plurality of lines of P photosensitive pixels and a pixel to pixel summation of signals read by the different lines and corresponding to said same image line, wherein the sensor is divided into a plurality of groups of N lines of P charge transfer pixels and in each group of lines summation is performed in an analog manner by charge transfer in column from pixel to pixel with progressive accumulation of charges corresponding to a same image point, wherein charges of the pixels of a last line of each group are read by a read circuit which is associated with said last line and which performs a charge-to-voltage conversion for each pixel, wherein further an analog signal resulting from said conversion is sent by a column conductor toward a respective digitization circuit which establishes for each column a digital value corresponding to each analog signal, and wherein a plurality of digital values, corresponding to respective groups of lines which have seen said same image line during the scan, are added together in each column.

\* \* \* \* \*